United States Patent
Liu et al.

(10) Patent No.: US 12,498,555 B2
(45) Date of Patent: Dec. 16, 2025

(54) CONTINUOUS ZOOM STEREOSCOPIC MICROSCOPE WITH ADJUSTABLE STEREOSCOPIC ANGLE

(71) Applicant: BEIHANG UNIVERSITY, Beijing (CN)

(72) Inventors: Chao Liu, Beijing (CN); Qionghua Wang, Beijing (CN); Zhao Jiang, Beijing (CN); Yi Zheng, Beijing (CN); Di Wang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 410 days.

(21) Appl. No.: 18/179,088

(22) Filed: Mar. 6, 2023

(65) Prior Publication Data
US 2023/0221540 A1    Jul. 13, 2023

Related U.S. Application Data (63) Continuation-in-part of application No. PCT/CN2021/095850, filed on May 25, 2021.

(30) Foreign Application Priority Data

Apr. 27, 2021    (CN) .......................... 202110456676.1

(51) Int. Cl.
*G02B 21/22*    (2006.01)
*G02B 21/02*    (2006.01)
(Continued)

(52) U.S. Cl.
CPC ........... *G02B 21/22* (2013.01); *G02B 21/025* (2013.01); *G02B 21/361* (2013.01); *G02B 26/005* (2013.01)

(58) Field of Classification Search
CPC .... G02B 21/22; G02B 21/025; G02B 21/361; G02B 21/0012; G02B 21/32; G02B 26/005; G02B 26/004
See application file for complete search history.

(56) References Cited

U.S. PATENT DOCUMENTS

| | | | |
|---|---|---|---|
| 5,280,332 A * | 1/1994 | Tocher ..................... | G01C 3/04 250/201.8 |
| 10,554,940 B1 * | 2/2020 | Ghazaryan ........... | H04N 9/3188 |
| 2004/0085628 A1 * | 5/2004 | Kawasaki .............. | G02B 21/06 359/385 |

FOREIGN PATENT DOCUMENTS

| | | |
|---|---|---|
| CN | 1975504 A | 6/2007 |
| CN | 101266333 A | 9/2008 |

(Continued)

OTHER PUBLICATIONS

The State Intellectual Property Office of People's Republic of China, Application No. or Publication No. 202110456676.1, First Office Action.
Written Opinion of the International Searching Authority of PCT/CN2021/095850, mailed Dec. 16, 2021.
International Search Report of PCT/CN2021/095850, mailed Dec. 16, 2021.

(Continued)

*Primary Examiner* — Mustak Choudhury
(74) *Attorney, Agent, or Firm* — FisherBroyles, LLP; Jason P. Mueller (57) ABSTRACT

The present disclosure provides a continuous zoom stereoscopic microscope with an adjustable stereoscopic angle, consisting of a microscope stand, a first eyepiece module, a second eyepiece module, a first objective module, a second objective module, a first Risley prism, a second Risley prism, a first image-rotating prism, a second image-rotating prism, a drive module, a control module and an illumination module. The drive module provides preset drive values for individual liquid lenses in the liquid lens sets according to different magnifications to change the focal lengths of the liquid lenses, thereby changing the effective focal lengths of (Continued)

the objective module and that of the eyepiece module, and finally achieving continuous and fast zooming of the stereoscopic microscope to be adapted to different working scenarios. The control module controls the relative angle between the two wedge-angle prisms in the Risley prism, achieving the continuous adjusting of the stereoscopic angle of the stereoscopic microscope, and then acquiring stereo images with different stereo senses.

17 Claims, 7 Drawing Sheets

(51) Int. Cl.
*G02B 21/36* (2006.01)
*G02B 26/00* (2006.01)

(56) References Cited

FOREIGN PATENT DOCUMENTS

| | | | |
|---|---|---|---|
| CN | 103487927 | A | 1/2014 |
| CN | 204989612 | U | 1/2016 |
| CN | 107797263 | A | 3/2018 |
| CN | 107966800 | A | 4/2018 |
| CN | 210605176 | U | 5/2020 |
| JP | H05154111 | A | 6/1993 |
| JP | 2007041558 | A | 2/2007 |

OTHER PUBLICATIONS

First search of priority document CN2021104566761, Date of filing Apr. 27, 2021, no other date on the document.

* cited by examiner

CONTINUOUS ZOOM STEREOSCOPIC MICROSCOPE WITH ADJUSTABLE STEREOSCOPIC ANGLE

CROSS REFERENCE TO RELATED APPLICATIONS

This application is a continuation-in-part bypass application of PCT/CN2021/095850, filed on May 25, 2021, which claims the benefit of the Chinese Patent Application CN202110456676.1, entitled "Continuous zoom stereoscopic microscope with adjustable stereoscopic angle", and filed on Apr. 27, 2021 with Chinese Patent Office, wherein the entire contents of both applications are incorporated herein by reference.

TECHNICAL FIELD

The present disclosure relates to the field of microscope, in particular to a stereoscopic microscope. More specifically, the present disclosure relates to a continuous zoom stereoscopic microscope with an adjustable stereoscopic angle.

BACKGROUND ART

The microscope is an optical instrument formed by combination of multiple lenses, wherein the object to be measured is imaged as a magnified real image through a microscope objective lens in the objective focal plane of the eyepiece, and then imaged through the eyepiece at infinity for human eyes to observe. Stereoscopic microscope, also known as solid microscope or dissecting microscope, refers to a visual instrument with a stereo sense of erect image. Stereoscopic microscope enables both eyes to observe the to-be-measured object from different angles, wherein the angle is called the stereoscopic angle, which is typically between 10 degrees to 16 degrees. Meanwhile, the stereoscopic microscope can be matched with an image sensor to present a magnified image on a computer screen for an observer to view. Stereoscopic microscopes have been widely used in fields such as electronics industry, biological dissection, clinical surgery and industrial inspection.

There are two structural forms of stereoscopic microscope systems: parallel optical path systems and oblique optical path systems. The former images the to-be-measured object at infinity through a shared front large objective lens, with the telescopic system in the middle, and then images, through a lens in a drawtube, the to-be-measured object in the objective focal plane of the eyepiece, and images, through the eyepiece, it at infinity for observation; and the latter images the to-be-measured object in the objective focal plane of the eyepiece through a Greenough system in which the optical axis and the object plane are not vertical to each other, and then images, through the eyepiece, it at infinity for observation. In parallel optical path systems, it is prone to aberrations when light rays passing through the edge of the shared front large objective lens, making the design difficult and cost high; and in oblique optical path systems, the optical axes of two paths of light rays form a certain angle, leading to a certain stereo visual aberration.

To achieve continuous change in size of the image of the to-be-measured object during observation, stereoscopic microscopes also gradually adopt a zoom stereoscopic microscope system. Conventional zoom stereoscopic microscopes are mainly a combination of solid lenses, making the conventional zoom stereoscopic microscopes not only limited in precision but also high in cost; the adaptability generally relies on external mechanical devices for actuation, which makes the response slow and increases the overall cost. In addition, conventional zoom stereoscopic microscopes only enable the selection of separated magnifications. Therefore, it is urgent to invent a stereoscopic microscope with a continuously varying stereoscopic angle, a fast response, an adjustable stereo sense and a continuous zoomability.

SUMMARY

The purpose of the present disclosure includes, for example, providing a stereoscopic microscope with a continuously varying stereoscopic angle, a fast response, an adjustable stereo sense and a continuous zoomability, so as to solve the problems such as limited precision, high cost and slow response of conventional zoom stereoscopic microscopes in the prior art.

The purpose of the present disclosure may be achieved in such a following way, for example, that embodiments of this disclosure provide a stereoscopic microscope, which may include: a microscope stand, a first eyepiece module, a second eyepiece module, a first objective module, a second objective module, a first Risley prism, a second Risley prism, a first image-rotating prism, a second image-rotating prism, a drive module, a control module and an illumination module.

Embodiments of this disclosure provide further a stereoscopic microscope, in which the microscope stand consists of a base, a stand and an objective sleeve.

Embodiments of this disclosure provide further a stereoscopic microscope, in which the first eyepiece module and the second eyepiece module are essentially same in structure, for example, both consisting of a number of solid lenses and liquid lenses.

Embodiments of this disclosure provide further a stereoscopic microscope, in which the first objective module and the second objective module are mounted in the objective sleeve, and the first objective module consists of a first liquid lens set and a first solid lens set, and the second objective module consists of a second liquid lens set and a second solid lens set.

Embodiments of this disclosure provide further a stereoscopic microscope, in which the first liquid lens set and the second liquid lens set are essentially same in structure, for example, both consisting of a number of liquid lenses.

Embodiments of this disclosure provide further a stereoscopic microscope, in which the first solid lens set and the second solid lens set are essentially same in structure, for example, both consisting of a number of solid lenses.

Embodiments of this disclosure provide further a stereoscopic microscope, in which the Risley prism consists of two wedge-angle prisms which are arranged co-axially adjacent to each other and capable of independently rotating around the axis.

Embodiments of this disclosure provide further a stereoscopic microscope, in which the image-rotating prism is used to achieve refraction of light rays and extension of optical paths.

Embodiments of this disclosure provide further a stereoscopic microscope, in which the drive module can dynamically change the focal length of each liquid lens in the liquid lens set in real time to achieve the continuous zooming of the stereoscopic microscope.

Embodiments of this disclosure provide further a stereoscopic microscope, in which the control module can dynamically adjust the rotating angles of the two wedge-angle prisms in the Risley prism, thereby achieving the adjustment of the stereoscopic angle of the stereoscopic microscope.

Embodiments of this disclosure provide further a stereoscopic microscope, in which the left-side optical path consists of the first eyepiece module, the first image-rotating prism, the first objective module and the first Risley prism, and the right-side optical path consists of the second eyepiece module, the second image-rotating prism, the second objective module and the second Risley prism, using the viewpoint of the observer as a reference.

The method of operating the focal length of the above-mentioned continuous zoom stereoscopic microscope with an adjustable stereoscopic angle provided according to embodiments of this disclosure comprises: before using, the drive module presetting several sets of drive values according to different magnifications required for the stereoscopic microscope. In the case of continuous zooming of the stereoscopic microscope, the drive module provides preset drive values for individual liquid lenses in the liquid lens set according to different magnifications to change the focal lengths of the liquid lenses, thereby changing the effective focal length of the objective module and that of the eyepiece module, and finally achieving continuous and fast zooming of the stereoscopic microscope to be adapted to different working scenarios.

The working procedure of the continuous zoom stereoscopic microscope with an adjustable stereoscopic angle provided according to embodiments of this disclosure may comprise that: two light beams with specific stereoscopic angles, emitted by the to-be-measured object after being illuminated by the illumination module, respectively pass through the first Risley prism and the second Risley prism, and after beam deflection through the two Risley prisms, two light beams, left-side light beam and right-side light beam, are formed, with optical axes of the two light beams parallel to the two objective modules; after the left-side light beam passes through the first objective module and then through the first image-rotating prism, the light ray is refracted, the optical path is extended and a left parallax image is formed; and after the right-side light beam passes through the second objective module and then through the second image-rotating prism, the light ray is refracted, the optical path is extended and a right parallax image is formed. The two parallax images are fused by the observer's brain to form a stereo image.

Figure 3:
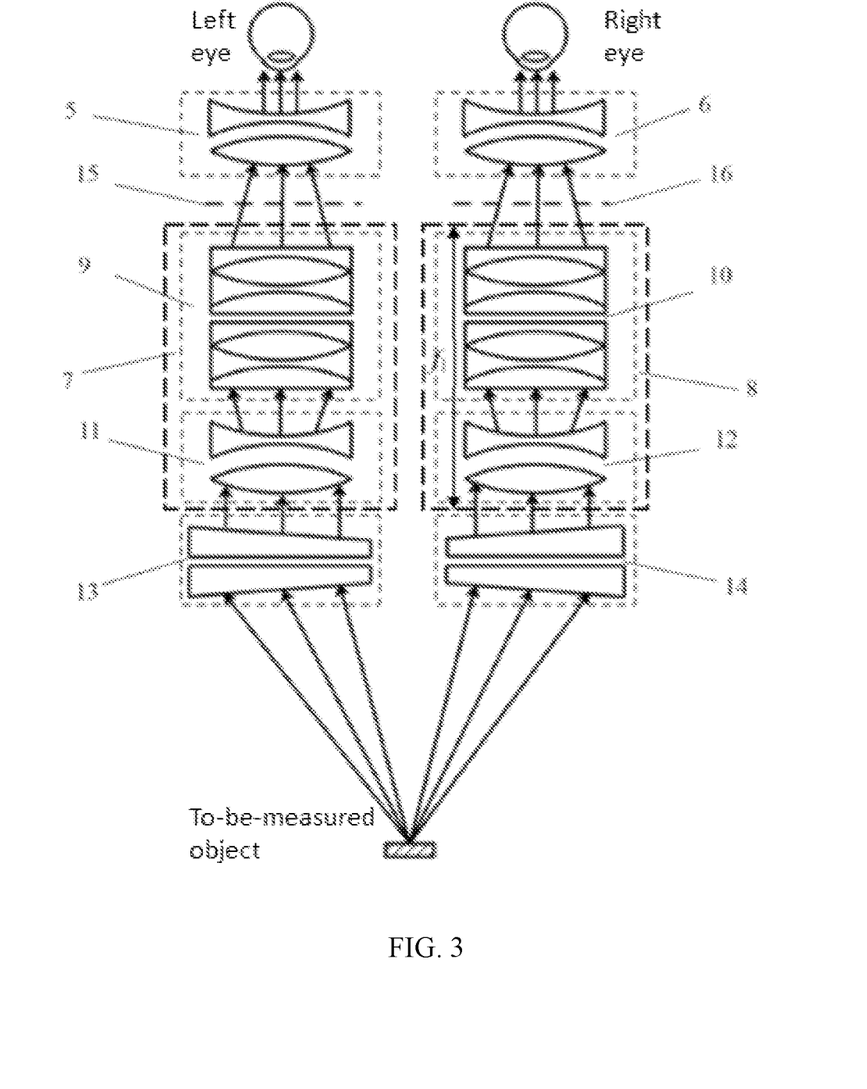
FIG. 3 shows an equivalent optical path diagram of the continuous zoom stereoscopic microscope with an adjustable stereoscopic angle at low magnification.
Figure 4:
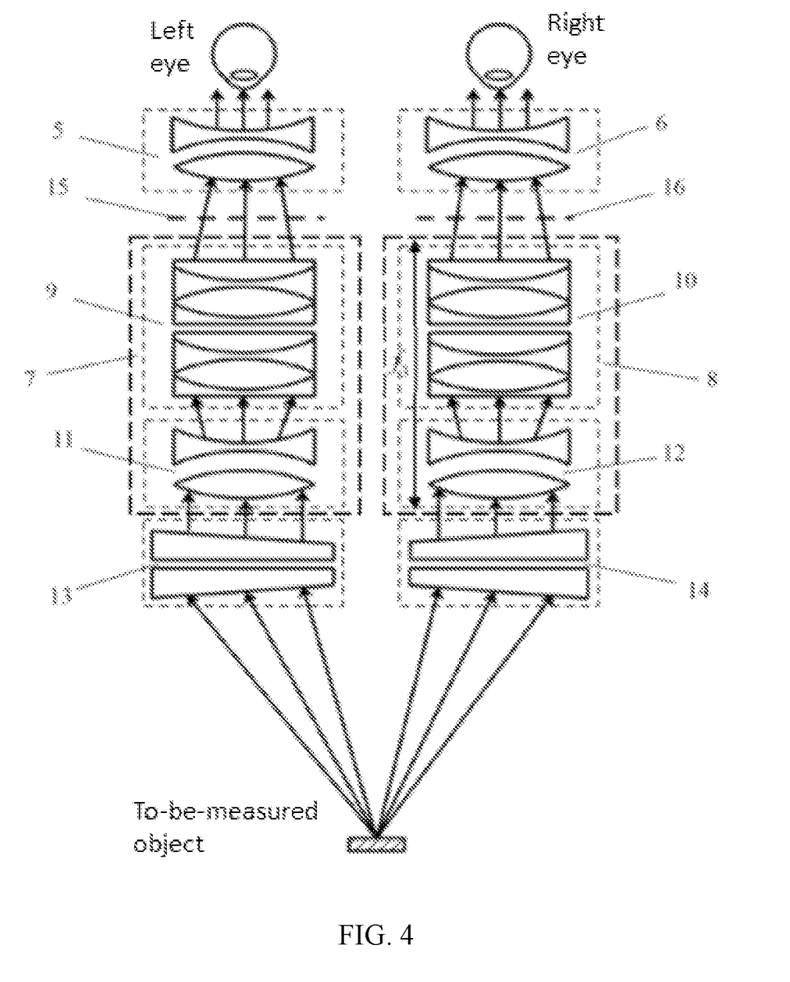
FIG. 4 shows an equivalent optical path diagram of the continuous zoom stereoscopic microscope with an adjustable stereoscopic angle at high magnification.

The process of continuous variation in magnification of the continuous zoom stereoscopic microscope with an adjustable stereoscopic angle provided by embodiments of this disclosure may include that:

when the stereoscopic microscope starts working, the drive module provides drive values required for a low magnification to the liquid lenses in the objective module and/or eyepiece module, so that the focal lengths of the liquid lenses change correspondingly, and the stereoscopic microscope is in a low magnification state at this time, of which the equivalent optical path diagram is as shown in FIG. 3; and when the observer needs to raise the magnification up, the drive module dynamically provides preset drive values corresponding to different magnifications to the liquid lenses in the objective module and/or eyepiece module, thereby changing the focal lengths of the liquid lenses in real time and then increasing the effective focal lengths of the eyepiece module and/or objective module to provide the observer with a stereo image at high magnification, achieving the continuous change of the magnification of the stereoscopic microscope, of which the equivalent optical path diagram is as shown in FIG. 4.

In the above process, the objective module and/or eyepiece module can perform aberration correction on the light beams and magnification adjustment on the stereoscopic microscope, by adjusting the focal lengths of the liquid lenses.

In order to observe the overall morphological information of the object to be measured, the stereoscopic microscope provided by embodiments of this disclosure can acquire images with different stereo senses of the object to be measured, i.e., acquiring images with different stereoscopic angles of the object to be measured.

Figure 7:
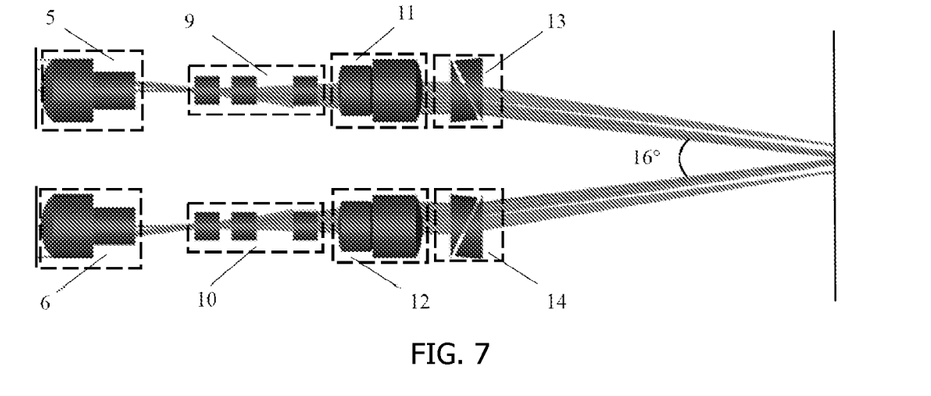
FIG. 7 shows a simulation principle diagram for the optical design of the continuous zoom stereoscopic microscope with an adjustable stereoscopic angle, with a stereoscopic angle of 16°.
Figure 8:
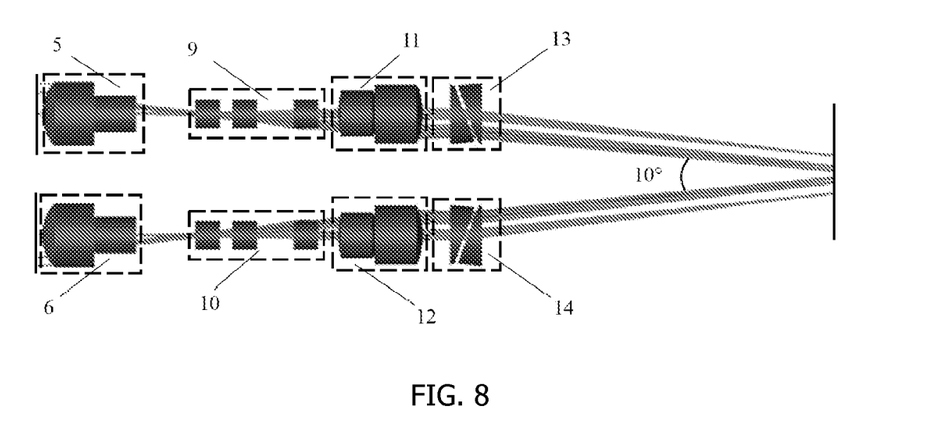
FIG. 8 shows a simulation principle diagram for the optical design of the continuous zoom stereoscopic microscope with adjustable stereoscopic angle, with a stereoscopic angle of 10°.

The method for the stereoscopic microscope provided by embodiments of this disclosure to acquire images with different stereoscopic angles, taking the left-side optical path as an example (the adjusting process of the right-side optical path is identical to that of the left-side optical path), may include the following procedures. In the initial state, the drive module provides the liquid lenses with corresponding drive values according to the required magnification, so that the stereoscopic microscope acquires a stereo image with a stereoscopic angle of al of the object to be measured, and the angles between the two wedge-angle prisms in the first Risley prism and the x-direction at this time are $\theta_1$ and $\theta_2$ respectively, of which the equivalent optical path diagram is as shown in FIG. 7. When it is necessary to observe from different perspectives the information of the object to be measured, the control module controls the two wedge-angle prisms in the first Risley prism to rotate independently around the optical axis of the Risley prism by a certain angle according to different depths (i.e., the distance of the desired imaging plane for observation from the center of the lens set), and at this time, the angles between the two wedge-angle prisms in the first Risley prism and the x-direction are $\theta_3$ and $\theta_4$ respectively, to change the refraction angle of the first Risley prism to the light beam, so that the two light beams, which are constantly kept outgoing after the light beams pass through the first Risley prism, are parallel to the main optical axes of the two objective modules. The drive module can provide the liquid lenses with corresponding drive values according to the relative angle between the two wedge-angle prisms in the first Risley prism, so that the stereoscopic microscope always provides a clear stereo image for the observer, and at this time, the stereoscopic microscope acquires a stereo image with a viewing angle of $\alpha 2$ of the object to be measured, wherein $\alpha 2 > \alpha 1$, of which the equivalent optical path diagram is as shown in FIG. 8.

In embodiments of this disclosure, a plane formed by the optical axes of the two Risley prism sets can be regarded as z-plane, the direction vertical to the z-plane is defined as the x-direction, and the direction vertical to the x-z-plane is defined as the y-direction.

In embodiments of this disclosure, different depths can be understood as different actual objective working distances of the microscope. If the size of the object in the z-direction is larger than the depth of field of the microscope, the object cannot be observed completely, and at this time, complete observation can be achieved by focusing on planes of different depths.

In embodiments of this disclosure, in order to ensure that the left- and right-side light rays are consistent, the magnitudes of $\theta_1$ and $\theta_2$ must be ensured consistent but with opposite signs (e.g., the angle of the clockwise acute angle is specified as the positive direction, then the angle of the counterclockwise acute angle as the negative direction), and the magnitudes of $\theta_3$ and $\theta_4$ are made to be consistent but with opposite signs (according to the sign rules of geometric optics, measured by acute angles, specifying that the clockwise angle is positive and the counterclockwise angle is negative).

With the change of stereoscopic angles, the acquired stereo sense of the image of the object to be measured changes correspondingly. During this process, the stereoscopic microscope can be continuously adjusted in magnification simultaneously.

The continuous zoom stereoscopic microscope with an adjustable stereoscopic angle provided by embodiments of this disclosure allows continuous parallax image acquisition. After the image sensor is connected at the back end of the eyepiece module and image acquisition is performed, the computer synthesizes the continuous parallax image to form a synthetic image, and then provides, on the displayer, the observer with a stereo image of the object to be measured.

Optionally, types of liquid lenses used in the liquid lens set include electrowetting driven liquid lenses, dielectrophoresis driven liquid lenses, mechanical motor-driven elastic thin film liquid lenses, magnetic control liquid lenses and electronic muscle-driven liquid lenses, etc.

Optionally, the Risley prisms are driven mechanically, electrically, etc.

Optionally, the image-rotating prisms are right-angle prisms, trigonal prisms, pentaprisms, etc.

Continuous zoom stereoscopic microscope with an adjustable stereoscopic angle provided by embodiments of this disclosure includes a left-side optical path and a right-side optical path, wherein the left-side optical path comprises:
a first eyepiece module, a first image-rotating prism, a first objective module, a first Risley prism;
the right-side optical path comprises:
a second eyepiece module, a second image-rotating prism, a second objective module, a second Risley prism;
the first image-rotating prism and the second image-rotating prism are used to achieve refraction of the light rays and extension of the optical paths;
the first Risley prism and the second Risley prism are configured to make the corresponding light beams parallel to the main optical axes of the corresponding objective modules, with the corresponding light beams constantly kept outgoing after the light beams passing through the first Risley prism and the second Risley prism; and
the microscope further includes a control module for adjusting the refraction angles of the first Risley prism and of the second Risley prism to the light rays, the control module being configured to allow change of the refraction angle of the first Risley prism and the second Risley prism to the light rays, so as to obtain a stereo image in different desired stereoscopic angles of the object to be measured.

Optionally, the first objective module and the second objective module each comprise P liquid lenses and Q solid lenses, wherein the number of the liquid lenses P≥0 and the number of the solid lenses Q≥0, P+Q≥1; the first eyepiece module and the second eyepiece module each comprise M liquid lenses and N solid lenses, wherein the number of the liquid lenses M≥0 and the number of the solid lenses N≥0, M+N≥1; and, P+M≥1.

Optionally, the microscope further includes a drive module, which is configured to change the focal lengths of the liquid lenses according to the desired stereoscopic angle, so as to obtain a clear stereo image with desired stereoscopic angle of the object to be measured.

Optionally, the first Risley prism and the second Risley prism each consist of two wedge-angle prisms with co-axial optical axes, wherein the two wedge-angle prisms are arranged adjacent to each other and can rotate independently around the optical axes of the Risley prisms.

Optionally, the control module is configured to change the refraction angles of the first and second Risley prisms to the light beams by respectively adjusting the rotating angles of the longitudinal axes of the two wedge-angle prisms in the first Risley prism and the two wedge-angle prisms in the second Risley prism relative to the x-direction.

Optionally, the first eyepiece module, the first image-rotating prism, the first objective module and the first Risley prism are arranged in sequence along a direction from the observer to the object to be measured; and the second eyepiece module, the second image-rotating prism, the second objective module and the second Risley prism are arranged in sequence along a direction from the observer to the object to be measured.

Optionally, the first objective module and the second objective module are each arranged with 2 solid lenses and 3 liquid lenses in sequence along the direction from the observer to the object to be measured; and the first eyepiece module and the second eyepiece module each include 2 solid lenses.

The method for imaging in different stereoscopic angles with microscope provided by embodiments of this disclosure includes:
the control module controlling, according to the first stereoscopic angle, the refraction angle of the first and second Risley prisms to the light rays to be a first refraction angle, so as to obtain a first stereo image in the first stereoscopic angle of the object to be measured;
the drive module calculating a matching first magnification according to the control data of the control module associated with the first stereoscopic angle, and providing drive values to the corresponding liquid lenses to obtain a first magnification of the microscope, thereby acquiring the first stereo image of the object to be measured, with the first magnification matching the first stereoscopic angle;
the control module controlling, according to the second stereoscopic angle, the refraction angle of the first and second Risley prisms to the light rays to be a second refraction angle, so as to obtain a second stereo image in the second stereoscopic angle of the object to be measured, wherein the second stereoscopic angle differs from the first stereoscopic angle; and
the drive module calculating a matching second magnification according to the control data of the control module associated with the second stereoscopic angle, and providing drive values to the corresponding liquid lenses to obtain a second magnification of the microscope, thereby acquiring the second stereo image of the object to be measured, with the second magnification matching the second stereoscopic angle.

Optionally, the first objective module and the second objective module have a focal length of 51.7 mm;
the angles between the longitudinal axes of the two wedge-angle prisms, which are arranged in sequence along the direction from the observer to the to-be-measured object in the Risley prism, and the x-direction are 0° and 30°, respectively; and the curvature radii of the three liquid lenses, which are arranged in sequence along the direction from the observer to the to-be-measured object in the first objective module and the second objective module, are 5.968 mm, 12.828 mm and −41.179 mm respectively, and the corresponding drive voltages are 62V, 51V and 39V, respectively.

Optionally, the first objective module and the second objective module have a focal length of 87.1 mm;
the angles between the longitudinal axes of the two wedge-angle prisms, which are arranged in sequence along the direction from the observer to the to-be-measured object in the Risley prism, and the x-direction are 0° and 48°, respectively; and
the curvature radii of the three liquid lenses, which are arranged in sequence along the direction from the observer to the to-be-measured object in the first objective module and the second objective module, are 5.811 mm, 10.691 mm and 21.399 mm respectively, and the corresponding drive voltages are 61V, 53V and 47.5V, respectively.

BRIEF DESCRIPTION OF DRAWINGS

In order to illustrate the technical solutions of embodiments of the present disclosure, the drawings which are necessary to be used in embodiments of the present disclosure shall be briefly introduced below. It should be appreciated that the following drawings only show some certain embodiments of the present disclosure and thus should not be regarded as limiting in scope, and that the following drawings are only schematic and not drawn to scale. For a skilled person in the art, other related drawings can be obtained from these drawings without paying inventive effort.

REFERENCE SIGNS

1—base; 2—stand; 3—objective sleeve; 4—illumination module; 5—first eyepiece module; 6—second eyepiece module; 7—first objective module; 8—second objective module; 9—first liquid lens set; 10—second liquid lens set; 11—first solid lens set; 12—second solid lens set; 13—first Risley prism; 14—second Risley prism; 15—first image-rotating prism; 16—second image-rotating prism.

DETAILED DESCRIPTION OF EMBODIMENTS

In order to make the purposes, technical solutions and advantages in embodiments of this disclosure more clear, the technical solutions in embodiments of the present disclosure will be described clearly and completely below in combination with the drawings in the embodiment of this disclosure. Obviously, the described embodiments are partial embodiments of this disclosure, and not all of them. The components of the embodiments of this disclosure generally described and illustrated in the accompanying drawings herein may be arranged and designed in a variety of different configurations.

Therefore, the following detailed description of embodiments of this disclosure provided in the drawings is not intended to limit the scope of the claimed disclosure but merely indicates selected embodiments of the present disclosure. Based on the embodiments in this disclosure, all other embodiments obtained by a skilled person in the art without creative labor fall within the scope claimed in this disclosure.

It should be noted that in the description of the present disclosure, orientation or positional relationship indicated by terms such as "center", "above", "below", "left", "right", "vertical", "horizontal", "inside", "outside" are based on the orientation or positional relationship shown in the drawings and are intended only to facilitate and simplify the description of the present disclosure, instead to indicate or imply that the device or element referred to must have a particular orientation, be constructed and operated in a particular orientation, and therefore are not to be construed as limit to the present disclosure. Moreover, terms such as "first", "second" and "third" are merely used for description and cannot be construed as an indication or implication of importance in relativity. The physical quantities in the formula, if not individually labeled, should be understood as the basic quantities of the basic SI unit, or as derived from the basic quantities through multiplication, division, differentiation or integration and other mathematical operations.

Figure 1:
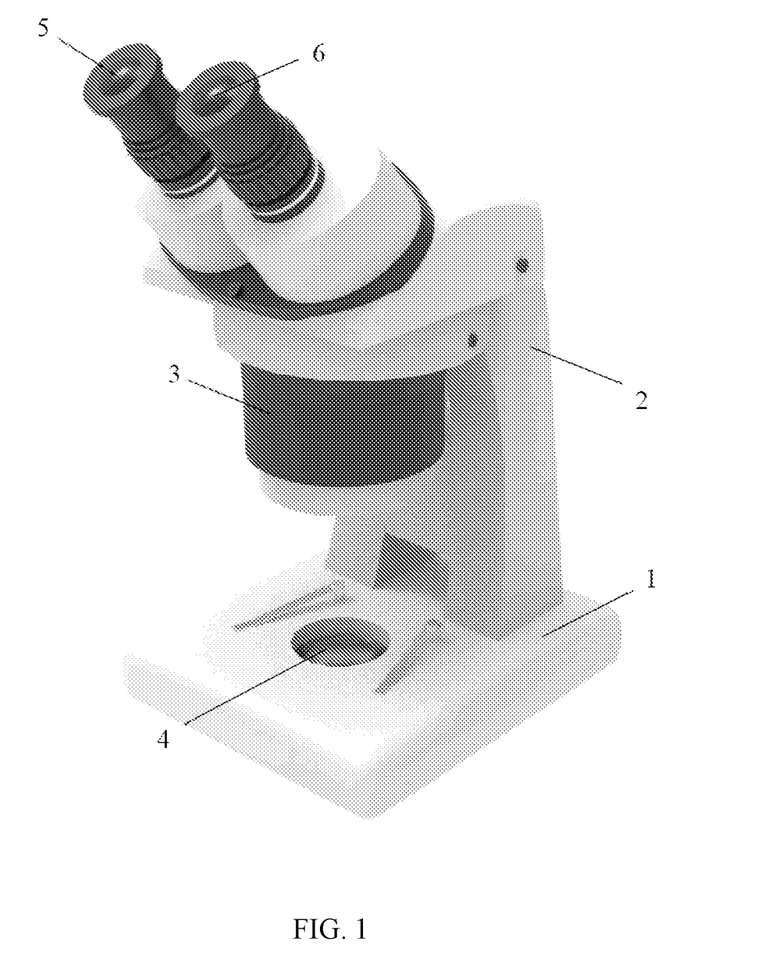
FIG. 1 shows an isometric stereo view of a continuous zoom stereoscopic microscope with an adjustable stereoscopic angle.

FIG. 1 is a stereo view of the continuous zoom stereoscopic microscope with an adjustable stereoscopic angle provided by embodiments of this disclosure. Referring to FIG. 1, the continuous zoom stereoscopic microscope with an adjustable stereoscopic angle provided by embodiments of this disclosure may include: a base 1, a stand 2, an objective sleeve 3, an illumination module 4, a first eyepiece module 5 and a second eyepiece module 6. The light source in the illumination module 4 can adjust different illumination angles along the optical axes of the optical paths of the microscope with respect to the object to be observed, i.e., the object to be measured. The base 1, the stand 2 and the objective sleeve 3 can form a microscope stand.

Figure 2:
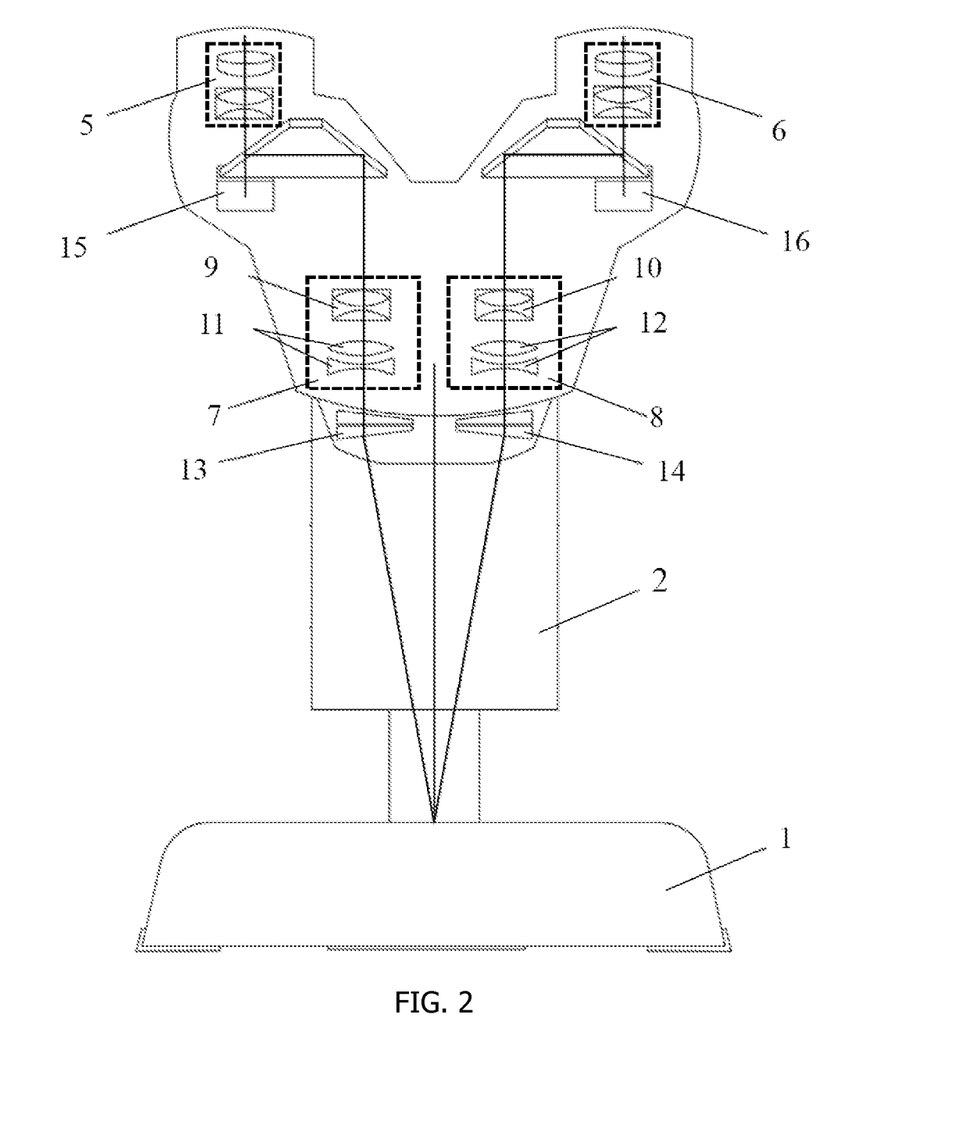
FIG. 2 shows a schematic front view of optical element arrangement and optical paths of the continuous zoom stereoscopic microscope with an adjustable stereoscopic angle.

FIG. 2 shows a schematic view of optical element arrangement and optical paths of the continuous zoom stereoscopic microscope with an adjustable stereoscopic angle provided by embodiments of the present disclosure. In this embodiment, the continuous zoom stereoscopic microscope with an adjustable stereoscopic angle may include: a base 1, a stand 2, an objective sleeve 3, an illumination module 4, a first eyepiece module 5, a second eyepiece module 6, a first objective module 7, a second objective module 8, a first Risley prism 13, a second Risley prism 14, a first image-rotating prism 15 and a second image-rotating prism 16.

In embodiments provided by this disclosure, the continuous zoom stereoscopic microscope with an adjustable stereoscopic angle may include a left-side optical path and a right-side optical path. In the embodiment shown in FIG. 2, the left-side optical path is the optical path consisting of the optical elements on the left side in the figure, the right-side optical path is the optical path consisting of the optical elements on the right side in the figure. The left-side optical path and the right-side optical path can include essentially the same optical elements. From the observer (not shown) located above in FIG. 2 to the object to be measured (shown in FIG. 3) located below in FIG. 2, the left-side optical path may include along the light propagation direction in sequence: a first eyepiece module 5, a first image-rotating prism 15, the first objective module 7 and the first refraction prism 13. From the observer located above in FIG. 2 to the object to be measured located below in FIG. 2, the right-side optical path may include in sequence: a second eyepiece module 6, a second image-rotating prism 16, a second objective module 8 and a second Risley prism 14.

In embodiments of this disclosure, the base 1, the stand 2 and the objective sleeve 3 can form a microscope stand.

In embodiments of this disclosure, the first eyepiece module 5 and the second eyepiece module 6 can be essentially same in structure, for example, a number of solid lenses and/or liquid lenses may be included.

In embodiments of this disclosure, the first objective module 7 and the second objective module 8 can be mounted within the objective sleeve.

In embodiments of this disclosure, the first objective module 7 may include a first liquid lens set 9 and/or a first solid lens set 11. The second objective module 8 may include a second liquid lens set 10 and/or a second solid lens set 12. The first liquid lens set 9 and the second liquid lens set 10 may be essentially same in structure, for example, may include a number of liquid lenses. The first solid lens set 11 and the second solid lens set 12 are essentially same in structure, for example, may include a number of solid lenses.

In embodiments of this disclosure, the Risley prism may consist of two wedge-angle prisms with co-axial optical axes, wherein the two wedge-angle prisms are arranged adjacent to each other and capable of independently rotating around the axis of the Risley prism.

In embodiments of this disclosure, the image-rotating prism can be configured to achieve refraction of light rays in the optical paths and extension of optical paths. The drive module can be configured to be capable of dynamically changing the focal length of each liquid lens in the liquid lens set in real time to achieve the continuous zooming of the stereoscopic microscope. The control module can be configured to dynamically adjust the rotating angles of the two wedge-angle prisms in the Risley prism, thereby achieving the adjustment of the stereoscopic angle of the stereoscopic microscope, and providing the observer with a clear stereo image of the to-be-measured object with a continuously changing stereoscopic angle through the continuous control of the control module and the drive module.

The working procedure of the stereoscopic microscope provided according to embodiments of this disclosure may comprise that: two light beams with specific stereoscopic angles emitted by the to-be-measured object after the to-be-measured object is illuminated by the illumination module respectively pass through the first Risley prism in the left-side optical path and the second Risley prism in the right-side optical path, and after beam deflection through the corresponding Risley prisms, a left-side light beam and a right-side light beam, with optical axes parallel to the optical axes of the objective modules in corresponding optical paths, are respectively formed in the left-side optical path and the right-side optical path; after the left-side light beam passes through the first objective module and then through the first image-rotating prism, the light ray of the beam is refracted, and the corresponding optical path is extended to form a left parallax image; after the right-side light beam passes through the second objective module and then through the second image-rotating prism, the light ray of the beam is refracted, and the corresponding optical path is extended to form a right parallax image; and the left parallax image and the right parallax image are fused by the observer's brain to form a stereo image.

The procedure for the stereoscopic microscope provided by embodiments of this disclosure to adjust magnification may include that:

when the stereoscopic microscope starts working, the drive module provides drive values required for a low magnification to the liquid lenses in the objective module and/or eyepiece module, so that the focal lengths of the liquid lenses change correspondingly, and the stereoscopic microscope is in a low magnification state at this time, as shown in FIG. 3, it is an equivalent optical path diagram of the continuous zoom stereoscopic microscope with an adjustable stereoscopic angle, wherein the first objective module 7 and the second objective module 8 have the focal length of f1;

when the observer needs to raise the magnification up, the drive module dynamically provides the liquid lenses in the eyepiece module and/or objective module with the preset drive values corresponding to different magnifications, thereby changing the focal lengths of the liquid lenses in real time and then increasing the effective focal lengths of the objective module and/or eyepiece module to achieve the continuous variation of the magnification of the stereoscopic microscope, providing the observer with a stereo image at high magnification, as shown in FIG. 4, it is the equivalent optical path diagram of the continuous zoom stereoscopic microscope with an adjustable stereoscopic angle at a high magnification, wherein the first objective module 7 and the second objective module 8 have the focal length of f3.

In the above process, the objective module and/or eyepiece module can perform aberration correction on the light beam and magnification adjustment on the stereoscopic microscope by adjusting the focal lengths of the liquid lenses.

The stereoscopic microscope provided by embodiments of this disclosure can acquire images with different stereo sense of the object to be measured, i.e., continuously acquiring clear images of the object to be measured in different stereoscopic angles, so as to observe the morphological information with different angles of the object to be measured.

When the stereoscopic microscope desires to obtain a stereo image of a to-be-measured object in the first stereoscopic angle, the control module controls according to the first stereoscopic angle the refraction angle of the Risley prism to the light rays to be a first refraction angle, so as to obtain a stereo image of the to-be-measured object, in the first stereoscopic angle. The drive module then calculates a matching first magnification according to the control data of the control module associated with the first stereoscopic angle, and correspondingly provides the liquid lenses with corresponding drive values to obtain a first magnification of the stereoscopic microscope, thereby acquiring a clear stereo image, in the first stereoscopic angle, of the to-be-measured object; When it is desired to obtain an observation effect of the to-be-measured object in a different stereoscopic angle such as the second stereoscopic angle, the control module controls the refraction angle of the Risley prism to the light rays to be a second refraction angle according to the desired second stereoscopic angle, so as to acquire a stereo image of the to-be-measured object in the second stereoscopic angle. During this process, the drive module of the stereoscopic microscope simultaneously adjusts the corresponding control data, according to the control data of the control module associated with the second stereoscopic angle, so as to perform continuous adjustment of the magnification (i.e., the drive module calculates a matching second magnification according to the control data of the control module associated with the second stereoscopic angle), so as to provide the observer with clear stereo images of the to-be-measured object with continuous changing stereoscopic angles.

Figure 5:
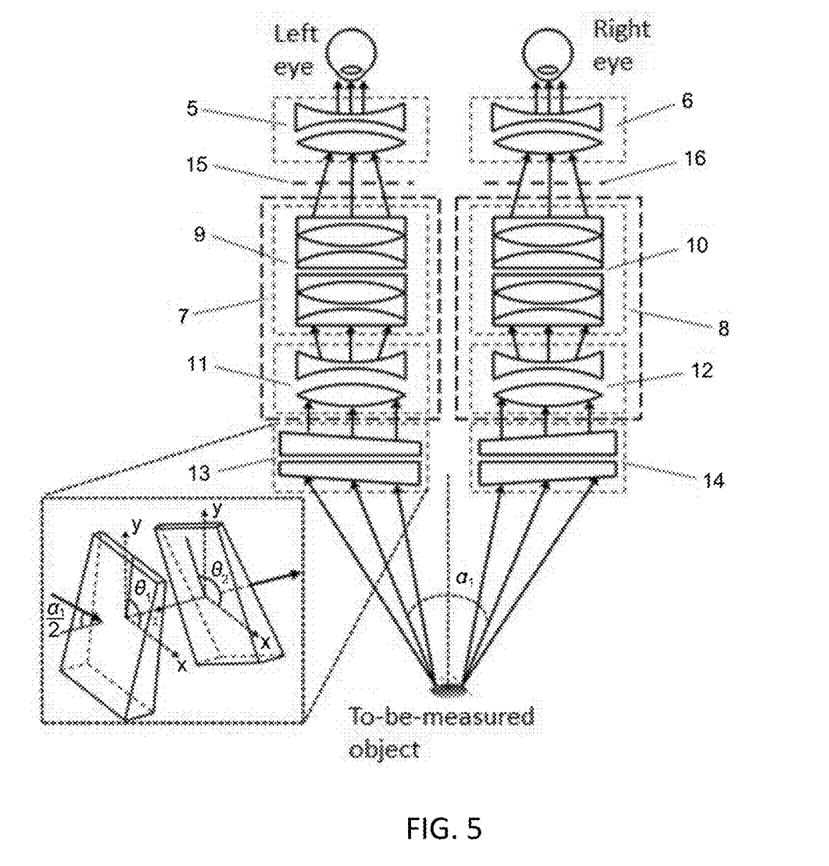
FIG. 5 shows an equivalent optical path diagram of the continuous zoom stereoscopic microscope with an adjustable stereoscopic angle, with a stereoscopic angle of α1.
Figure 6:
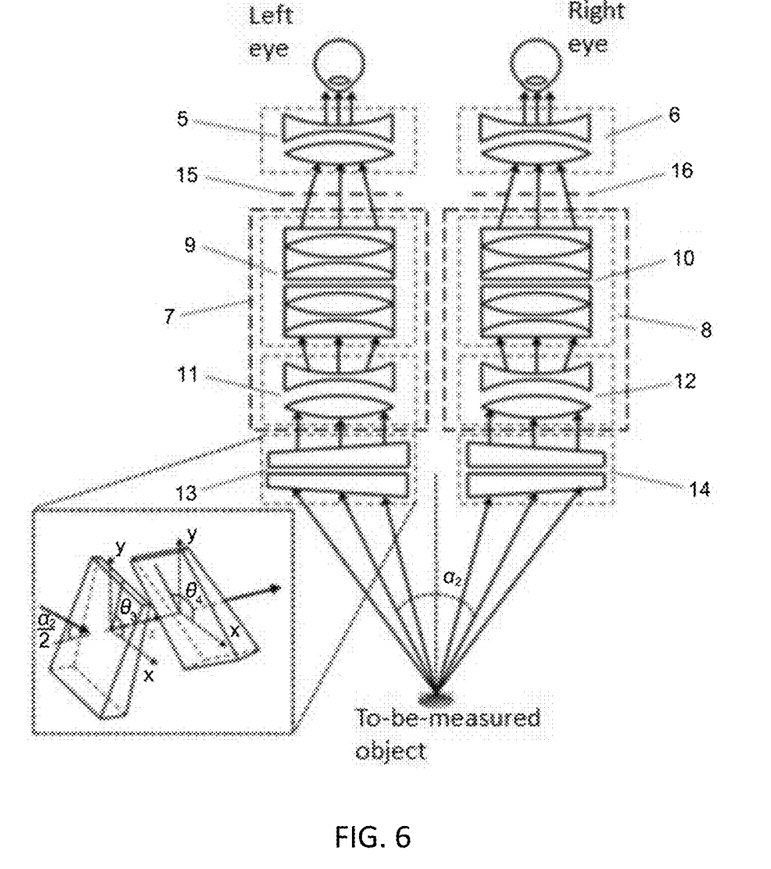
FIG. 6 shows an equivalent optical path diagram of the continuous zoom stereoscopic microscope with an adjustable stereoscopic angle, with a stereoscopic angle of α2.

Specifically, for example, referring to FIG. 5 and FIG. 6, here, the z-axis is parallel to the optical axis of the Risley prism, the plane formed by optical axes of the two Risley prism sets is parallel to the z-plane, the plane vertical to the z-plane is exactly the x-y-plane. The x-direction and y-direction can be defined depending on the observer or the structure of the microscope itself. For example, depending on the observer's viewing direction or viewing angle, in the x-y plane, a direction vertical to the z-plane is defined as the x-direction, and a direction vertical to the x-direction is defined as the y-direction. In other words, the plane formed by the optical axes of the two Risley prism sets can be regarded as z-plane, and the direction vertical to the z-plane is determined as the x-direction, while the direction vertical to the x-z-plane is determined as the y-direction.

The line connecting midpoints of the two sides of the wedge-angle prism in the Risley prism is the longitudinal axis of the wedge-angle prism, with the two sides extending essentially vertical to the y-z-plane.

In the initial state, the stereoscopic microscope has a certain magnification. As shown in FIG. 5, taking the left-side optical path as an example (the adjusting process of the right-side optical path is identical to that of the left-side optical path), the control module sets the angles between the longitudinal axes of the two wedge-angle prisms in the first Risley prism and the x-direction to be $\theta_1$ and $\theta_2$ respectively, and sets the refraction angle of the first Risley prism to the light rays to be the first refraction angle, so as to obtain a stereo image of the to-be-measured object in the stereoscopic angle $\alpha 1$. Almost simultaneously or then, the drive module calculates a first magnification, matching for acquiring the clear image, according to the associated control data of the control module in case of the stereoscopic angle of $\alpha 1$, and correspondingly provides the liquid lenses with corresponding drive values to adjust the magnification of the stereoscopic microscope to the first magnification, so as to obtain a clear stereo image of the to-be-measured object in viewing angle of $\alpha 1$.

In order to ensure that the left- and right-side light rays are consistent, the magnitudes of $\theta 1$ and $\theta 2$ must be ensured consistent but with opposite signs (e.g., the angle of the clockwise acute angle is specified as the positive direction, then the angle of the counterclockwise acute angle as the negative direction), and the magnitudes of $\theta 3$ and $\theta 4$ are made to be consistent but with opposite signs (according to the sign rules of geometric optics, measured by acute angles, specifying that the clockwise angle is positive and the counterclockwise angle is negative).

When it is desired to obtain observation effect of the to-be-measured object in different stereoscopic angles, as shown in FIG. 6, taking the left-side optical path as an example (the adjustment process of the right-side optical path is similar to that of the left-side optical path), the control module controls, according to the desired stereoscopic angle $\alpha 2$, the two wedge-angle prisms in the first Risley prism to rotate independently around the axis by a certain angle, so as to make the angles between the longitudinal axes of the two wedge-angle prisms in the first Risley prism and the x-direction to be $\theta_3$ and $\theta_4$ respectively, so that the refraction angle of the first Risley prism to the light rays is the second refraction angle, so as to obtain a stereo image, with the stereoscopic angle $\alpha 2$, of the object to be measured. Almost simultaneously or then, the drive module calculates a second magnification, matching for acquiring the clear image, according to the associated control data of the control module in case of the stereoscopic angle of $\alpha 2$, and provides the liquid lenses with corresponding drive values to correspondingly adjust the magnification of the stereoscopic microscope to the second magnification, so as to enable the stereoscopic microscope to provide the observer with a clear stereo image, with stereoscopic angle $\alpha 2$, of the object to be measured.

In embodiments shown in FIG. 5 and FIG. 6, $\alpha 2 > \alpha 1$.

With the change of stereoscopic angle, the stereo sense of the obtained stereo image of the object to be measured changes correspondingly. In this process, the drive module of the stereoscopic microscope can simultaneously perform continuous adjustment of the magnification to provide the observer with clear stereo images, with continuously changing stereoscopic angles, of the object to be measured.

For a better understanding of the present disclosure, simulation principle diagrams for optical design of the continuous zoom stereoscopic microscope with an adjustable stereoscopic angle in embodiments of this disclosure as shown in FIG. 7 and FIG. 8 are further provided.

The simulation principle diagram for optical design of the continuous zoom stereoscopic microscope with an adjustable stereoscopic angle is shown in FIG. 7, when the stereoscopic angle of the continuous zoom stereoscopic microscope with an adjustable stereoscopic angle provided by embodiments of this disclosure is 16°. In the above, the focal length of the objective module is 51.7 mm. The first eyepiece module 5 and the second eyepiece module 6 are essentially same in structure, i.e., both including 2 solid lenses. The first objective module 7 and the second objective module 8 are essentially same in structure, i.e., both including 2 solid lenses and 3 electrowetting driven liquid lenses. The Risley prism includes two wedge-angle prisms, wherein angles between the longitudinal axes of the two wedge-angle prisms and the x-direction are 0° and 30° respectively, with the two wedge-angle prisms being arranged in sequence along the direction from the observer to the object to be measured; the curvature radii of the three liquid lenses, which are arranged in sequence along the direction from the observer to the object to be measured, in the first objective module 7 and the second objective module 8 are 5.968 mm, 12.828 mm and −41.179 mm respectively, and the corresponding drive voltages are 62V, 51V and 39V respectively. At this point, the stereoscopic microscope obtains two parallax images of the to-be-measured object with a viewing angle of 16°, which are fused by the observer's brain to form a clear stereo image.

The simulation principle diagram for optical design of the continuous zoom stereoscopic microscope with an adjustable stereoscopic angle with a stereoscopic angle of 10° is shown in FIG. 8. The focal length of the objective module is 87.1 mm, the first eyepiece module 5 and the second eyepiece module 6 are same in structure, both consisting of 2 solid lenses; the first objective module 7 and the second objective module 8 are essentially same in structure, i.e., including 2 solid lenses and 3 electrowetting driven liquid lenses; the Risley prism may include two wedge-angle prisms, wherein angles between the longitudinal axes of the two wedge-angle prisms and the x-direction are 0° and 48° respectively, with two wedge-angle prisms being arranged in sequence along the direction from the observer to the to-be-measured object; the curvature radii of the three liquid lenses, which are arranged in sequence along the direction from the observer to the object to be measured, are 5.811 mm, 10.691 mm and 21.399 mm respectively, and the corresponding drive voltages are 61V, 53V and 47.5V, respectively. At this point, the stereoscopic microscope obtains two parallax images of the to-be-measured object with a viewing angle of 10°, which are fused by the observer's brain to form a clear stereo image.

Continuous change of the stereoscopic angle in the range of 10°~16° can be achieved by adjusting the relative angle between the two wedge-angle prisms in the Risley prism. The stereo senses of the stereo images of the to-be-measured object obtained by the observer differ when the stereoscopic angles differ. In this process, by changing the focal lengths of the individual liquid lenses through the drive module, continuous adjustment of the magnification of the stereoscopic microscope can be simultaneously achieved to provide the observer with clear stereo images, with different stereoscopic angles, of the to-be-measured object.

INDUSTRIAL APPLICABILITY

The stereoscopic microscope provided by embodiments of the present disclosure can acquire images with different stereo senses of the object to be measured, i.e., acquiring clear images, with different stereoscopic angles, of the object to be measured, so as to observe the morphological information in different angles of the object to be measured. In embodiments provided by the present disclosure, the image-rotating prism of the stereoscopic microscope can be configured to achieve refraction of light rays in the optical paths and extension of optical paths, and the drive module can be configured to be capable of dynamically changing the focal length of each liquid lens in the liquid lens set in real time to achieve the continuous zooming of the stereoscopic microscope. The control module can be configured to dynamically adjust the rotating angles of the two wedge-angle prisms in the Risley prism, thereby achieving the adjustment of the stereoscopic angle of the stereoscopic microscope, providing the observer with a clear stereo image of the to-be-measured object with a continuously changing stereoscopic angle through the continuous control of the control module and the drive module.

What is claimed is:

1. A continuous zoom stereoscopic microscope with an adjustable stereoscopic angle, comprising: a microscope stand, a first eyepiece module, a second eyepiece module, a first objective module, a second objective module, a first Risley prism, a second Risley prism, a first image-rotating prism, a second image-rotating prism, a drive module, a control module and an illumination module, wherein the microscope stand consists of a base, a stand and an objective sleeve; the first eyepiece module and the second eyepiece module are same in structure, consisting of a number of solid lenses and liquid lenses; the first objective module and the second objective module are mounted within the objective sleeve, the first objective module consists of a first liquid lens set and a first solid lens set, the second objective module consists of a second liquid lens set and a second solid lens set; the first liquid lens set and the second liquid lens set are same in structure, each consisting of a number of liquid lenses, the first solid lens set and the second solid lens set are same in structure, each consisting of a number of solid lenses; the Risley prism consists of two wedge-angle prisms which are arranged co-axially adjacent to each other and capable of independently rotating around an axis; the image-rotating prisms have an function of achieving refraction of light rays and extension of optical paths; the drive module is configured to be able to dynamically change a focal length of each liquid lens in the liquid lens set in real time to achieve the continuous zooming of the stereoscopic microscope; the control module is configured to be able to dynamically adjust rotating angles of the two wedge-angle prisms in the Risley prism, thereby achieving adjustment of the stereoscopic angle of the stereoscopic microscope; a left-side optical path consists of the first eyepiece module, the first image-rotating prism, the first objective module and the first Risley prism, and a right-side optical path consists of the second eyepiece module, the second image-rotating prism, the second objective module and the second Risley prism, using the viewpoint of an observer as a reference; wherein before use of the stereoscopic microscope, the drive module presets several sets of drive values according to different magnifications required for the stereoscopic microscope; when the stereoscopic microscope performs continuous zooming, the drive module provides the preset drive values for individual liquid lenses in the liquid lens sets according to different magnifications to change the focal lengths of the liquid lenses, thereby changing effective focal lengths of the objective modules and the eyepiece modules, and finally achieving continuous and fast zooming of the stereoscopic microscope to be adapted to different working scenarios; the stereoscopic microscope has a working procedure in which: two light beams with specific stereoscopic angles emitted by a to-be-measured object respectively pass through the first Risley prism and the second Risley prism, and forms, after beam deflection through the two Risley prisms, two light beams which are left-side light beam and right-side light beam and have optical axes parallel to the two objective modules; after the left-side light beam passes through the first objective module and then through the first image-rotating prism, the light ray is refracted, the optical path is extended and a left parallax image is formed; after the right-side light beam passes through the second objective module and then through the second image-rotating prism, the light ray is refracted, the optical path is extended and a right parallax image is formed; the two parallax images are fused by a brain of the observer to form a stereo image;

the stereoscopic microscope has a magnification changing process in which: when the stereoscopic microscope starts working, the drive module provides drive values required for a low magnification to the individual liquid lenses in the objective modules and eyepiece modules, so that the focal lengths of the liquid lenses change correspondingly, and the stereoscopic microscope is in a low magnification state at this time; when the observer needs to raise the magnification up, the drive module dynamically provides the preset drive values to the individual liquid lenses in the objective modules and eyepiece modules, with the preset drive values corresponding to different magnifications, thereby changing the focal lengths of the liquid lenses in real time and further increasing the effective focal lengths of the objective modules and the eyepiece modules to provide the observer with a stereo image at high magnification, achieving the continuous change of the magnification of the stereoscopic microscope; in the process, the objective modules and eyepiece modules each can perform aberration correction on the light beams and magnification adjustment on the stereoscopic microscope by adjusting the focal lengths of the liquid lenses; and in order to observe overall morphological information of the to-be-measured object, the stereoscopic microscope can acquire images with different stereo senses of the to-be-measured object, i.e., acquiring images of the to-be-measured object with different stereoscopic angles; taking the left-side optical path as an example, in the initial state, the drive module provides the liquid lenses with corresponding drive values according to required magnification, so that the stereoscopic microscope acquires a stereo image of the to-be-measured object with a stereoscopic angle of $\alpha 1$, and angles between the two wedge-angle prisms in the first Risley prism and the x-direction at this time are $\theta 1$ and $\theta 2$ respectively; when needing to observe the information of the to-be-measured object from different viewing angles, the control module controls according to different depths the two wedge-angle prisms in the first Risley prism to rotate independently around the axis by a certain angle, and at this time, the angles between the two wedge-angle prisms in the first Risley prism and the x-direction are $\theta 3$ and $\theta 4$ respectively, thereby changing refraction angles of the first Risley prism to the light beams, so that the two light beams, which are constantly kept outgoing after the light beams pass through the first Risley prism, are parallel to the two objective modules; the drive module can provide the liquid lenses with corresponding drive values according to a relative angle between the two wedge-angle prisms in the first Risley prism, so that the stereoscopic microscope always provides a clear stereo image for the observer, and the stereoscopic microscope acquires at this time a stereo image of the to-be-measured object with a viewing angle of $\alpha 2$ of the to-be-measured object, wherein $\alpha 2 > \alpha 1$; with change of the stereoscopic angles, the stereo sense of the acquired image of the to-be-measured object changes correspondingly; during this process, the stereoscopic microscope can perform continuous adjustment on magnification simultaneously; an adjustment process of the right-side optical path is consistent to that of the left-side optical path.

2. The continuous zoom stereoscopic microscope with an adjustable stereoscopic angle according to claim 1, wherein after an image sensor is connected at a back end of the eyepiece module and image acquisition is performed, a synthetic image is formed by a computer synthesizing the continuous parallax images, and then the stereo image of the to-be-measured object is provided on a displayer for the observer.

3. The continuous zoom stereoscopic microscope with an adjustable stereoscopic angle according to claim 1, wherein types of the liquid lenses used in the liquid lens sets comprise electrowetting driven liquid lenses, dielectrophoresis driven liquid lenses, mechanical motor-driven elastic thin film liquid lenses, magnetic control liquid lenses and electronic muscle-driven liquid lenses, etc.

4. The continuous zoom stereoscopic microscope with an adjustable stereoscopic angle according to claim 1, wherein the Risley prisms are driven mechanically, electrically, etc.

5. The continuous zoom stereoscopic microscope with an adjustable stereoscopic angle according to claim 1, wherein the image-rotating prisms are right-angle prisms, trigonal prisms, pentaprisms, etc.

6. The continuous zoom stereoscopic microscope with an adjustable stereoscopic angle according to claim 1, wherein the first objective module and the second objective module are same in structure, wherein the number P of the liquid lenses is $\geq 0$ and the number Q of the solid lenses is $\geq 0$, $P+Q \geq 1$; the first eyepiece module and the second eyepiece module are same in structure, wherein the number M of the liquid lenses is 20 and the number N of the solid lenses is $\geq 0$, $M+N \geq 1$; and, $P+M \geq 1$.

7. The continuous zoom stereoscopic microscope with an adjustable stereoscopic angle according to claim 1, wherein a plane formed by optical axes of the two Risley prism sets is regarded as a z-plane, a direction vertical to the z-plane is defined as the x-direction, and a direction vertical to a x-z-plane is defined as y-direction.

8. The continuous zoom stereoscopic microscope with an adjustable stereoscopic angle according to claim 7, wherein the angle between the wedge-angle prism in the Risley prism and the x-direction is the angle between the longitudinal axis of the wedge-angle prism and the x-direction.

9. A continuous zoom stereoscopic microscope with an adjustable stereoscopic angle, comprising a left-side optical path and a right-side optical path, wherein the left-side optical path comprises:
a first eyepiece module, a first image-rotating prism, a first objective module and a first Risley prism;
the right-side optical path comprises:
a second eyepiece module, a second image-rotating prism, a second objective module, a second Risley prism;
the first image-rotating prism and the second image-rotating prism are configured to achieve refraction of light rays and extension of the optical paths;
the first Risley prism and the second Risley prism are configured to make the corresponding light beams, which are constantly kept outgoing after the light beams pass through the first Risley prism and the second Risley prism, parallel to a main optical axis of the corresponding objective module;
the microscope further comprises a control module for adjusting the refraction angles of the first Risley prism and of the second Risley prism to the light rays, wherein the control module is configured to allow change of the refraction angles of the first Risley prism and the second Risley prism to the light rays, so as to obtain stereo images of the to-be-measured object in different desired stereoscopic angles,
wherein the first objective module and the second objective module each comprise P liquid lenses and Q solid lenses, wherein the number P of the liquid lenses is $\geq 0$ and the number Q of the solid lenses is $>0$, $P+Q \geq 1$; the first eyepiece module and the second eyepiece module each comprise M liquid lenses and N solid lenses, wherein the number M of the liquid lenses is $\geq 0$ and the number N of the solid lenses is $\geq 0$, $M+N \geq 1$; and, $P+M \geq 1$.

10. The microscope according to claim 9, wherein the microscope further comprises a drive module, which is configured to change focal lengths of the liquid lenses according to the desired stereoscopic angle, so as to obtain a clear stereo image of the to-be-measured object in desired stereoscopic angle.

11. The microscope according to claim 9, wherein the first Risley prism and the second Risley prism each consist of two wedge-angle prisms with co-axial optical axes, wherein the two wedge-angle prisms are arranged adjacent to each other and are configured to be rotatable independently around the optical axes of the Risley prisms.

12. The microscope according to claim 11, wherein a plane formed by the optical axes of the two Risley prism sets is regarded as a z-plane, a direction vertical to the z-plane is defined as the x-direction, and a direction vertical to a x-z-plane is defined as y-direction;
the control module is configured to: change the refraction angles of the first and second Risley prisms to the light beams by respectively adjusting the rotating angle, relative to the x-direction, of the longitudinal axes of the two wedge-angle prisms in the first Risley prism and the two wedge-angle prisms in the second Risley prism.

13. The microscope according to claim 9, wherein
the first eyepiece module, the first image-rotating prism, the first objective module and the first Risley prism are arranged in sequence along a direction from the observer to the to-be-measured object;
the second eyepiece module, the second image-rotating prism, the second objective module and the second Risley prism are arranged in sequence along the direction from the observer to the to-be-measured object.

14. The microscope according to claim 9, wherein
the first objective module and the second objective module are each provided with 2 solid lenses and 3 liquid lenses in sequence along the direction from the observer to the to-be-measured object; and
the first eyepiece module and the second eyepiece module each comprise 2 solid lenses.

15. A method for imaging a to-be-measured object using the microscope according to claim 9, comprising:
the control module controlling, according to a first stereoscopic angle, the refraction angle of the first and second Risley prisms to the light rays to be a first refraction angle, so as to obtain a first stereo image of the to-be-measured object in the first stereoscopic angle;
the drive module calculating a matching first magnification according to the control data of the control module associated with the first stereoscopic angle, and providing the corresponding liquid lenses with drive values to obtain a first magnification of the microscope, thereby acquiring the first stereo image of the to-be-measured object with the first magnification matching the first stereoscopic angle;
the control module controlling, according to a second stereoscopic angle, the refraction angle of the first and second Risley prisms to the light rays to be a second refraction angle, so as to obtain a second stereo image of the to-be-measured object in the second stereoscopic angle, wherein the second stereoscopic angle differs from the first stereoscopic angle; and
the drive module calculating a matching second magnification according to the control data of the control module associated with the second stereoscopic angle, and providing the corresponding liquid lenses with drive values to obtain a second magnification of the microscope, thereby acquiring the second stereo image of the to-be-measured object with the second magnification matching the second stereoscopic angle.

16. The method according to claim 15, wherein
the first objective module and the second objective module have a focal length of 51.7 mm;
the angles between the x-direction and the longitudinal axes of the two wedge-angle prisms, which are arranged in sequence along the direction from the observer to the to-be-measured object in the Risley prism, are 0° and 30°, respectively; and
three liquid lenses, which are arranged in sequence along the direction from the observer to the to-be-measured object in the first objective module and the second objective module, have curvature radii of 5.968 mm, 12.828 mm and −41.179 mm respectively, and corresponding drive voltages of 62V, 51V and 39V respectively.

17. The method according to claim 15, wherein
the first objective module and of the second objective module have a focal length of 87.1 mm;
the angles between the x-direction and the longitudinal axes of the two wedge-angle prisms, which are arranged in sequence along the direction from the observer to the to-be-measured object in the Risley prism, are 0° and 48°, respectively;
the three liquid lenses, which are arranged in sequence along the direction from the observer to the to-be-measured object in the first objective module and the second objective module, have the curvature radii of 5.811 mm, 10.691 mm and 21.399 mm respectively, and the corresponding drive voltages of 61V, 53V and 47.5V, respectively.

* * * * *